Patented Apr. 13, 1943

2,316,536

UNITED STATES PATENT OFFICE 2,316,536

POLYMERIZATION OF ACETYLENE

Otto Fuchs, Frankfort-on-the-Main-Hochst, Germany; vested in the Alien Property Custodian No Drawing. Application April 4, 1941, Serial No. 386,850. In Germany February 9, 1940

4 Claims. (Cl. 260—678)

The present invention relates to the polymerization of acetylene.

Various processes are already known for preparing aliphatic polymeric products of acetylene while using a contact which consists of an aqueous or non-aqueous solution of cuprous salts and amino salts or alkali metal salts. Processes and catalysts for the production of non-benzenoid polymeric products of acetylene have been described in U. S. Patents Nos. 1,811,959, 1,876,857, 1,926,039, 1,926,055, 1,926,056, 2,048,838, 2,110,971, 2,162,373 and elsewhere. All of this prior art is based upon the catalytic action of cuprous copper either alone or assisted by another material as a catalyst. In said processes it may be suitable to choose the cuprous salts in as high a concentration as possible in order to obtain a high yield within a certain time and space. Since salt solutions of such a high concentration very readily tend to crystallization, it is necessary in the industrial realization of the process to keep the concentration of the cuprous salt at a lower degree, whereby, however, the yield within a certain time and space is likewise correspondingly reduced.

Now I have found that the concentration of the cuprous salt (and in consequence thereof the yield within a certain time and space) may be increased, without there existing any tendency of crystallization, by adding to the contact solution a substance capable of forming dipolar ions (Zwitter ions) in the solvent used. As substances of the afore-named kind there may be used particularly amino-carboxylic acids, such as amino-acetic acid, alanine, amino-butyric acids, amino-succinic acid; furthermore peptides, polypeptides, amino-benzoic acids and betaines, for instance trimethylglycocoll, trimethyl-betaine of the amino-benzoic acids.

The process may be carried out as follows: the acetylene is pumped from below through the solution of the reaction in a cylindrical, vertical vessel. During this operation the acetylene transformed is continuously replaced in known manner by the addition of a fresh portion of acetylene, whereas the non-transformed acetylene is reconducted into the reaction chamber by means of a gas circulating pump. By this method of operating the low reaction products: monovinyl-acetylene ($C_4H_4$), divinyl-acetylene ($C_6H_6$) and butadienyl-acetylene ($C_8H_8$) and a mixture of $C_8H_8$-polymers are removed from the contact solution by the current of gas of the non-transformed acetylene leaving the chamber; these products separate automatically from the acetylene by cooling to —75° C.

It may be suitable to perform the reaction in an acid medium; for this purpose a mineral acid, preferably hydrogen chloride, is added.

Besides water there are suitable as liquid medium for the contact alcohols, for instance methyl-alcohol, ethyl-alcohol or amyl-alcohol.

The following examples serve to illustrate the invention, but they are not intended to limit it thereto:

(1a) The contact solution consists of 1100 grams of $Cu_2Cl_2$, 660 grams of $NH_4Cl$, 16 cc. of concentrated HCl and 1200 grams of water; this solution is saturated at 33° C. The reaction temperature amounts to 65° C.–67° C. and the circulating portion of acetylene to 400 liters per hour. 45 grams of acetylene polymers are obtained per hour and per 2 liters of contact solution by means of a condensation at —75° C. 78.5 per cent by weight of the acetylene polymers constitute $C_4H_4$ and 21.5 per cent are higher polymeric products (chiefly $C_8H_8$-polymers).

(1b) Under the same conditions as those named in Example 1a, however at a circulating current of acetylene of 600 liters per hour there are obtained the corresponding figures: 39 grams of acetylene-polymers per hour and per 2 liters of contact solution; 85 per cent thereof are $C_4H_4$ and 15 per cent are $C_6H_6$ and $C_8H_8$.

(2a) The contact solution consists of 1700 grams $Cu_2Cl_2$, 660 grams of $NH_4Cl$, 450 grams of amino-acetic acid, 500 cc. of concentrated HCl and 700 cc. of water; though this solution contains 54.5 per cent of $Cu_2Cl_2$ more than the solution of Example 1a, its saturation temperature (32° C.) is even 1 degree lower. Under the experimental conditions named in Example 1a there are thus obtained: 65 grams of acetylene polymers per hour and per 2 liters of contact solution; 73 per cent thereof are $C_4H_4$ and 27 per cent are $C_6H_6$ and $C_8H_8$.

(2b) By using the same contact solution as in Example 2a, increasing, however, the circulating portion of acetylene to 600 liters per hour (as described in Example 1b) there are obtained: 57 grams of acetylene polymers per hour and per 2 liters of contact solution; 81.5 per cent thereof constitute $C_4H_4$ and 18.5 per cent are $C_6H_6$ and $C_8H_8$.

A summary of the results is evident by the following table: It may be seen therefrom that the portion of $C_2H_2$-polymers obtained per hour and per 2 liters of contact solution is considerably increased by raising the concentration of the cuprous chloride; this increase has been rendered possible by the addition of amino-acetic acid and when the same portion of acetylene is caused to circulate this increase is greater in the polymers $C_6H_6$ and $C_8H_8$ than in the polymeric product $C_4H_4$ (see Examples 1a and 2a); but if it is desired to obtain $C_4H_4$ as the main product this increase of the yield within a certain time and space may be displaced in favor of $C_4H_4$ by an increased circulation of acetylene (see Examples 1a and 2b).

| Example | Amino-acetic acid | Circulating portion of $C_2H_2$ | Gram of the crude product per hour and per 2 liters of contact solution | This crude product contains $C_6H_6$ and $C_8H_8$ polymers in— | |
|---|---|---|---|---|---|
| | | | | Grams | Per cent by weight |
| 1a | Without | 400 liters per hour | 45 | 9.7 | 21.5 |
| 2a | With | 400 liters per hour | 65 | 17.5 | 27 |
| 1b | Without | 600 liters per hour | 39 | 5.8 | 15 |
| 2b | With | 600 liters per hour | 57 | 10.5 | 18.5 |

I claim:

1. In the process of polymerizing acetylene to non-benzenoid polymers thereof the step which comprises passing acetylene through a catalyst containing a liquid medium, a cuprous salt, a salt of the group consisting of alkali metal salts and ammonium salts and an organic compound capable of forming dipolar ions in said liquid medium and selected from the class consisting of aminocarboxylic acids, betaines, peptides and polypeptides.

2. In the process of polymerizing acetylene to non-benzenoid polymers thereof the step which comprises passing acetylene through an aqueous catalyst, containing a cuprous salt, a salt of the group consisting of alkali metal salts and ammonium salts, a mineral acid and an organic compound capable of forming dipolar ions in aqueous solution and selected from the class consisting of aminocarboxylic acids, betaines, peptides and polypeptides.

3. In the process of polymerizing acetylene to non-benzenoid polymers thereof the step which comprises passing acetylene through an aqueous catalyst, containing a cuprous salt, a salt of the group consisting of alkali metal salts and ammonium salts, a mineral acid and an aminocarboxylic acid capable of forming dipolar ions in aqueous solution.

4. In the process of polymerizing acetylene to non-benzenoid polymers thereof the step which comprises passing acetylene through an aqueous catalyst containing cuprous-chloride, ammonium chloride, hydrogen chloride and amino-acetic acid.

OTTO FUCHS.